United States Patent

Doege et al.

[11] Patent Number: 4,851,728
[45] Date of Patent: Jul. 25, 1989

[54] COMMUTATOR FOR AN ELECTRIC MACHINE

[75] Inventors: Günter Doege; Peter Jakob; Ing L. Wilhelmy, all of Berlin, Fed. Rep. of Germany

[73] Assignee: Hubner Elektromaschinen AG, Berlin, Fed. Rep. of Germany

[21] Appl. No.: 231,877

[22] Filed: Aug. 12, 1988

[30] Foreign Application Priority Data

Aug. 19, 1987 [EP] European Pat. Off. ............ 87112050
Aug. 28, 1987 [EP] European Pat. Off. ............ 87112585

[51] Int. Cl.$^4$ ............................................ H02K 13/10
[52] U.S. Cl. ...................................... 310/233; 310/219
[58] Field of Search ............... 310/219, 233, 234, 235, 310/236, 248

[56] References Cited

U.S. PATENT DOCUMENTS

| 257,566 | 5/1882 | Eddy | 310/236 |
|---|---|---|---|
| 258,022 | 5/1882 | Cooley | 310/236 |
| 448,040 | 3/1891 | Hornberger | 310/236 |
| 520,264 | 5/1894 | Hoffman | 310/236 |
| 866,262 | 9/1907 | Coleman | 310/237 |
| 2,037,457 | 4/1936 | Colson | 310/219 |
| 3,911,303 | 10/1975 | Hu et al. | 310/236 |
| 4,283,841 | 8/1981 | Kamiyama | 310/236 |
| 4,399,383 | 8/1983 | Kamiyama | 310/236 |

Primary Examiner—Patrick R. Salce
Assistant Examiner—Anita M. Ault
Attorney, Agent, or Firm—Fleit, Jacobson, Cohn, Price, Holman & Stern

[57] ABSTRACT

A commutator for an electric machine with reciprocally insulated metal segments is described. At least one groove is made in the segments in the circumferential direction of the commutator and receives an insert formed from a precious metal or electrographite part. The axial width of the inserts only takes up part of the commutator contact surface. Alternatively two inserts are juxtaposed in each segment.

15 Claims, 2 Drawing Sheets

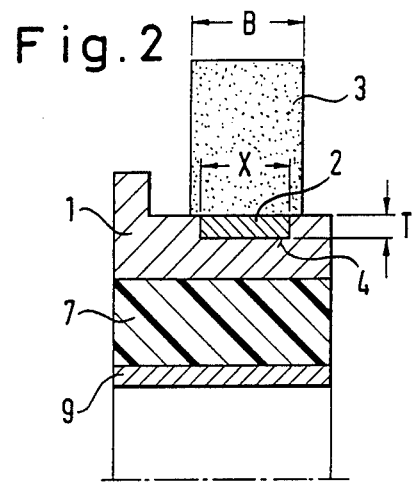
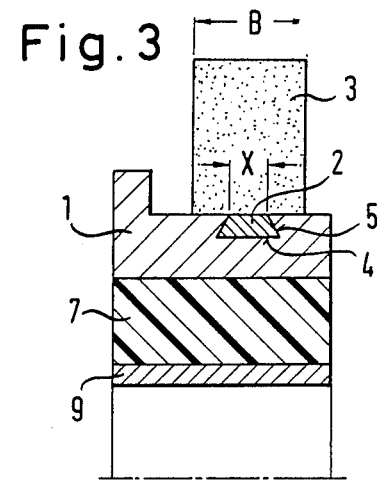
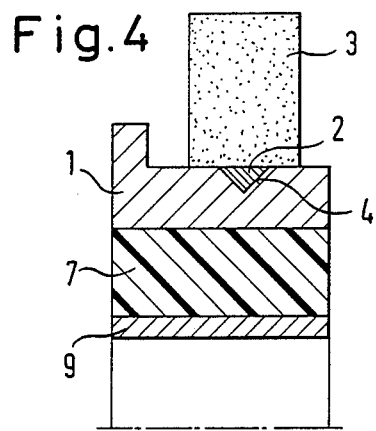
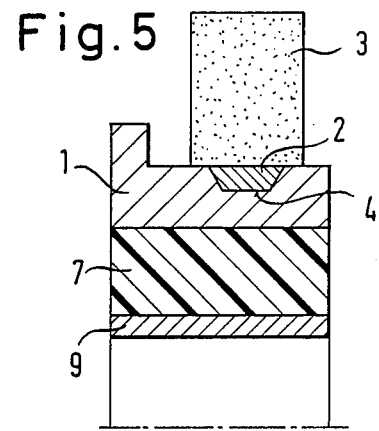
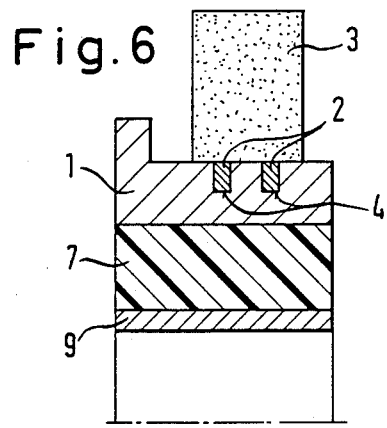
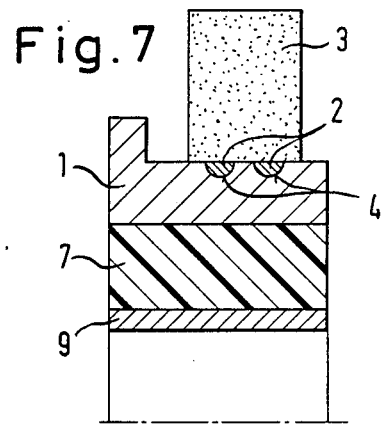

COMMUTATOR FOR AN ELECTRIC MACHINE

BACKGROUND OF THE INVENTION

The invention relates to a commutator for an electric machine with metal segments insulated from one another for voltage or current collection or supply by means of brushes, the segments being provided with a contact material to further improve the sliding contact with the brushes.

BACKGROUND INFORMATION

As is known, such commutators used in connection with generators and motors. For example, in the case of direct current tachogenerators they are used as transducers in measuring, control and regulating technology. As a result of the high terminating impedance of the series-connected evaluating unit, the current density in the brushes and the thermal loading of the commutator are very low, being only a few milliamperes. Thus, in the case of d.c. tachogenerators, different criteria apply with regards to the dimensioning of commutators and carbon brushes than e.g. with power machines.

A number of variants are known in connection with the commutating of direct current tachogenerators. If a copper commutator together with graphite brushes is used, then particularly in the low speed range there can often be a high harmonic content of the d.c. signal in the case of fluctuating voltage gradients, because unavoidably oxide and sulphite coatings form on the copper commutator surface. Therefore in certain uses silver graphite-containing carbon brushes have proved advantageous. As a result of the silver percentage in the carbon brush a protective silver graphite coating, called the patina is formed on the copper commutator contact surface. On the one hand this leads to limited wear to the carbon brushes and commutator and on the other hand brings about a good and uniform contact resistance due to its high electrical conductivity. However, the service life is very dependent on the environmental conditions. In the case of aggressive or corrosive atmospheres or under the influence of oil or grease, increased abrasion occurs and the formation of the patina is prevented. Therefore the operating characteristics can be significantly impaired due to the roughened surface.

It is also known to manufacture the commutator segments from a precious metal or a precious metal alloy. However, account must then be taken of the high material costs, due to the high weight percentage of the precious metal.

It is also known to roll a precious metal coating onto the segments. However, the high material and production costs of the bimetal are disadvantageous. As the precious metal coating covers the entire surface of the commutator segments, the precious metal proportion is relatively high.

Only a very limited coating thickness can be obtained when the segments are electroplated with a precious metal, the thickness only being a few micrometres. This excludes a subsequent working of the commutator contact surface, which can only be brought about by turning in order to achieve a high concentricity. Thus, electroplating must take place as the final operation on the fitted armature of the tachogenerator, which is complicated and costly. There is also a risk of electroplated precious metal coating being wholly or partly removed during operation by mechanical damage or abrasion.

SUMMARY OF THE INVENTION

The problem of the present invention is to provide a commutator of the aforementioned type, whose service life is considerably extended, even under unfavourable environmental conditions with at the same time good electrical characteristics and ease of manufacture.

According to the invention this problem is solved in that within the commutator contact surface, the segments are in each case provided with at least one recess and that in said recess is fixed a contact material insert flush with the segment surface.

The invention has the advantage that it is possible to use graphite brushes with good conducting and sliding characteristics, without there being any risk of disturbing oxide and sulphite coatings forming on the commutator surface, because neither the precious metal, nor the graphite is damaged by aggressive environmental influences. By limiting the groove to the effective commutator contact surface or the only part thereof, relatively small precious metal quantities are required. However, it is still possible to subsequently work the precious metal pieces for obtaining a high concentricity, because the precious metal is sufficiently deeply embedded in the groove. The groove can be produced in a simple manner, e.g. by turning, milling or sawing. The inserts can be produced from prefabricated piece material. It is particularly advantageous for the contact material insert to have a height of approximately 0.5 mm.

According to a preferred embodiment of the invention the recess is constructed as a groove running in the circumferential direction of the commutator.

It can alternatively also be advantageous for the recess to be constructed as a groove running in the axial direction of the commutator. In particularly if the segments are initially produced as piece material, from which the individual segments are cut in the desired width, the production of the groove and the introduction of the contact material insert can take place in simple manner. In this variant it is recommended to choose a brush, whose contact area in the circumferential direction is larger than the distance between two adjacent contact material inserts, so that on rotating the commutator the brush constantly engages with at least one contact material insert. This prevents an interchange between the contact material insert and the remaining segment material. Another alternative further development comprises constructing the recess as a sloping or arrow-shaped groove. This has the advantage that on passing over the segments, the entire width of the brush is in contact with the contact material insert and that despite this, in the circumferential direction the commutator is provided to the greatest possible extent with the contact material inserts.

It may also be appropriate to construct the recess as a radially directed, round opening and preferably as a blind hole.

According to a preferred further development in the circumferential direction two parallel grooves with contact material inserts are provided. This leads to a multiple, direct sliding contact between the brushes and the inserts or, in the case of twin brushes, each brush has its own insert. To simplify manufacture, the two inserts can also be constructed as a single, wider insert.

Particularly good results are obtained if the contact material insert is constructed as a precious metal insert.

According to an alternative, an electrographite insert is fixed in the grooves.

The construction of the groove and the introduction and fixing of the insert are particularly easy, if the cross-section of the groove and the insert is rectangular or square. Commercially available precious metal strips or graphite bars can be used for producing the inserts. However, it is also possible to use other groove cross-sections, such as e.g. triangular, trapezoidal and the like.

A particularly firm connection is obtained if the cross-section of the groove and insert is dovetailed.

It can alternatively also be appropriate for the groove and the insert to have a circular segmental cross-section. The inserts are then preferably obtained from round wires or bars, which can be turned to the corresponding cross-section after fitting.

The insert can be fixed particularly easily in the groove by means of a conductive adhesive.

An alternative fixing can comprise the insert being held by soldering, welding or beading. The precious metal insert can also be introduced by flame spraying.

A particularly simple production process for the inventive commutator involves introducing the contact material in one piece into the grooves of several commutator segments and is subsequently separated between the segments.

As an alternative and with respect to the insulation located between the segments, it can be appropriate to introduce the inserts prefabricated in accurate-to-fit manner in the particular grooves.

BRIEF DESCRIPTION OF THE DRAWINGS

The invention is described in greater detail hereinafter relative to embodiments and the attached drawings, wherein show:

FIG. 2 is a cross-section through the commutator according to the first embodiment shown in FIG. 1 along section line II—II of FIG. 1.

FIGS. 3 to 7 diagramatically a cross-section through a second to sixth embodiment of a commutator along section line II—II.

DESCRIPTION OF THE PREFERRED EMBODIMENTS

Figure 1:
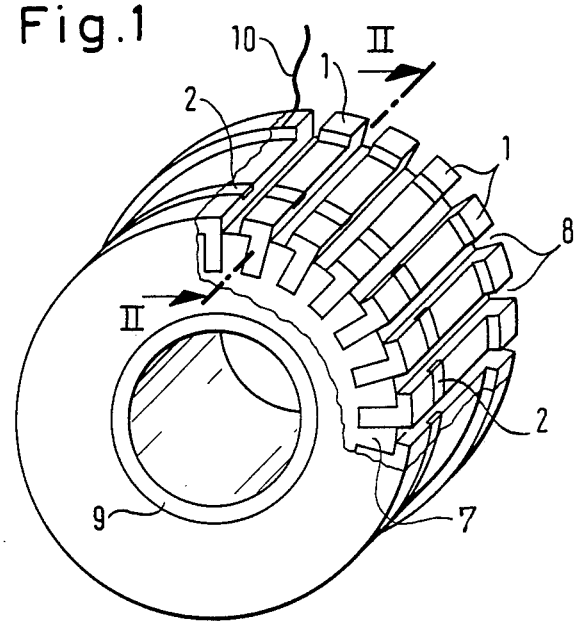
FIG. 1 diagrammatically a first embodiment of a commutator in perspective view.

According to FIG. 1, the commutator comprises a plurality of copper or copper alloy segments 1. They are held by a cylindrical support 7 made from insulating plastic. In the outer circumferential region, the segments 1 are electrically insulated from one another by radially directed slots 8. The commutator is mounted on a not shown shaft with a hub 9 and together with a rotor and is connected in non-rotary manner thereto. Each of the segments is connected by means of winding connections 10 to a corresponding number of not shown rotor windings. Only one such winding connection 10 is diagrammatically illustrated so as not to overburden the drawing.

In the embodiment shown in FIG. 1, in the commutator contact surface in each case one precious metal insert 2 is placed in the individual segments 1 and its effective surface only takes up part of the total contact surface.

FIG. 2 shows a cross-section along section line II—II for a first embodiment. In this and the following drawings, the same parts as in FIG. 1 carry the same reference numerals. It is common to all the embodiments that at least one circumferentially directed groove 4 is formed in the segments 1 and in same are surface flush inserted and fixed the precious metal inserts 2.

The precious metal inserts 2 are located within the commutator contact surface, which is defined by the width of a carbon brush 3. The width X of the inserts is appropriately smaller than the width B of the commutator contact surface, but can also be larger. The depth T of groove 4, which corresponds to the height of the precious metal insert 2 is chosen in such a way that the commutator can undergo machining or the like for obtaining high concentricity. It is ensured that at all times an adequate height of the precious metal insert 2 is ensured. In practice, a height of precious metal insert 2 of approximately 0.5 mm is advantageous.

In place of a precious metal, such as gold, silver or an alloy, it is also possible to use electrographite for the insert in segments 1.

FIG. 4 shows a triangular and FIG. 5 a trapezoidal cross-section of insert 2 in groove 4.

FIG. 3 illustrates an embodiment in which the width X of the precious metal insert 2 is clearly smaller than the width B of the contact surface. In exemplified manner, a dovetailed cross-section 5 of the precious metal insert 2 is shown and this leads to a particularly firm anchoring in segment 1.

FIG. 6 shows a further variant, in which two juxtaposed precious metal inserts 2 are worked into the segment 1 within the contact surfaces.

FIG. 7 shows in exemplified manner a circular segmental cross-section of two juxtaposed precious metal inserts 2 and the associated grooves 4.

FIGS. 2 to 7 in each case only show one brush 3, although in practice two or more juxtaposed brushes can be used.

Figure 8:
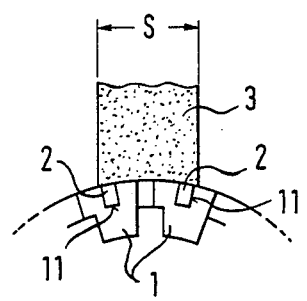
FIG. 8 diagrammatically a side view of a seventh embodiment of a commutator in the axial direction, a detail along the outer circumference of the commutator being chosen.

FIG. 8 illustrates an arc segment detail of the commutator with two adjacent segments 1. It can be gathered from this side view that each segment 1 is provided with a groove 11 running in the axial direction of the commutator and which is filled surface-flush with a precious metal insert 2. In order to avoid a metal interchange between the precious metal inserts 2 and the copper in which they are embedded, the thickness S of the brush is somewhat larger than the distance between the two precious metal inserts 2.

FIG. 8 illustrates an embodiment in which the precious metal inserts 2 extend over the entire width of segments 1. To save materials, the precious metal inserts 2 can be shorter than the width B of brush 3 in accordance with FIGS. 2 to 5.

Figure 9:
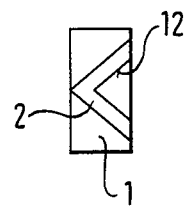
FIGS. 9 and 10 diagrammatically a peripheral plan view of a segment of an eighth or ninth embodiment of a commutator.
Figure 10:
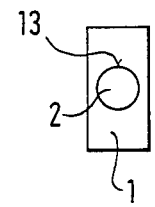

FIGS. 9 and 10, constituting a plan view of a segment 1, illustrate further arrangements for the precious metal inserts 2. FIG. 8 illustrates an arrow-shaped groove 12 with the precious metal insert 2. According to FIG. 9 the precious metal insert 2 is fixed in a round blind hole 13.

We claim:
1. A commutator for an electric machine, comprising:
a cylindrical support made from insulating plastic;
a plurality of radially directed slots on the outer circumferential region of said cylindrical support;

a plurality of metal segments held by said radially directed slots of the cylindrical support and electrically insulated from one another in the outer circumferential region of said cylindrical support;

a circumferentially extending commutator contact surface having a predetermined width and including at least parts of the circumferential surface of the segments;

each of the segments being provided with at least one circumferential recess within the commutator contact surface;

a precious metal insert being fixed in each recess flush with the segment surface; and each of the inserts having a width considerably smaller than the width of the contact surface.

2. A commutator according to claim 1, wherein the insert has a height of approximately 0.5 mm.

3. A commutator according to claim 1, wherein there are circumferentially two parallel recesses with inserts.

4. A commutator according to claim 1, wherein the recess is constructed as a sloping or arrow-shaped groove.

5. A commutator according to claim 1, wherein the cross-section of the recess and the insert is rectangular.

6. A commutator according to claim 1, wherein the cross-section of the recess and the insert is square, triangular or trapezoidal.

7. A commutator according to claim 1, wherein the cross-section of the recess and the insert is dovetailed.

8. A commutator according to claim 1, wherein the recess and the insert have a circular segmental cross-section.

9. A commutator according to claim 1, wherein the recess is constructed as a radially directed opening.

10. A commutator according to claim 1, wherein the insert is fixed by means of a conductive adhesive.

11. A commutator according to claim 1, wherein the insert is secured by soldering, welding or beading.

12. A commutator according to claim 1, wherein the insert is produced by flame spraying.

13. A commutator according to claim 1, wherein for producing the insert, the precious metal is placed in one piece in the recesses of several commutator segments and is subsequently separated between the segments.

14. A commutator according to claim 1, wherein inserts prefabricated in accurate-to-fit manner are placed in the recesses.

15. A commutator according to claim 1, wherein the precious metal insert is silver.

* * * * *